(12) United States Patent
Ostergaard

(10) Patent No.: US 6,839,575 B2
(45) Date of Patent: Jan. 4, 2005

(54) DISPLAYING A TABLE

(75) Inventor: Christian Ostergaard, Copenhagen (DK)

(73) Assignee: Nokia Mobile Phones Limited, Espoo (FI)

( * ) Notice: Subject to any disclaimer, the term of this patent is extended or adjusted under 35 U.S.C. 154(b) by 623 days.

(21) Appl. No.: 09/864,319

(22) Filed: May 25, 2001

(65) Prior Publication Data

US 2002/0013165 A1 Jan. 31, 2002

(30) Foreign Application Priority Data

May 26, 2000 (GB) .............................................. 0012949

(51) Int. Cl.⁷ ........................... H04M 1/00; H04B 1/38; G09G 5/00
(52) U.S. Cl. .................. 455/566; 455/90.3; 455/90.2; 455/575.1; 345/864; 345/810
(58) Field of Search ............................... 455/566, 575.1, 455/90.3, 556.1, 556.2, 557, 90.2, 550.1; 345/684, 665, 711, 784, 786, 810, 841, 864, 845, 798, 865, 856

(56) References Cited

U.S. PATENT DOCUMENTS

| | | | | |
|---|---|---|---|---|
| 5,812,131 A | * | 9/1998 | Bertram | 345/798 |
| 5,825,353 A | * | 10/1998 | Will | 345/184 |
| 5,856,827 A | * | 1/1999 | Sudo | 345/841 |
| 6,271,835 B1 | * | 8/2001 | Hoeksma | 345/168 |
| 6,313,848 B1 | * | 11/2001 | Hoag | 345/684 |
| 6,334,049 B1 | * | 12/2001 | Nishiyama et al. | 455/566 |
| 6,377,821 B2 | * | 4/2002 | Forlenzo et al. | 455/566 |
| 6,639,611 B1 | * | 10/2003 | Leduc | 345/764 |

FOREIGN PATENT DOCUMENTS

| | | | |
|---|---|---|---|
| EP | 0607731 | 7/1994 | |
| EP | 0844553 | 5/1998 | |
| EP | 0949559 | 10/1999 | |
| GB | 2344038 | * 5/2000 | G06F/3/14 |

OTHER PUBLICATIONS

WAP Architecture, Version 30 Apr. 1998, Wireless Application Protocol Architecture Specification, pp. 1–20.

* cited by examiner

*Primary Examiner*—Duc M. Nguyen
(74) *Attorney, Agent, or Firm*—Antonelli, Terry, Stout & Kraus, LLP

(57) ABSTRACT

A WAP telephone handset has a display (5) which displays a WML card that includes a table consisting of data cells (C) arrayed in rows and columns. A focus (22) can be scrolled through the rows of the display and a row selected. Not all the columns need be displayed. The selected row is then displayed as a column so that the focus can be scrolled through data items in the column. The column widths may be scaled downwardly to increase the number displayed when the table includes a larger number of columns. Navigation indicators may be provided to indicate the size of the array and the position of the focus within the array.

28 Claims, 7 Drawing Sheets

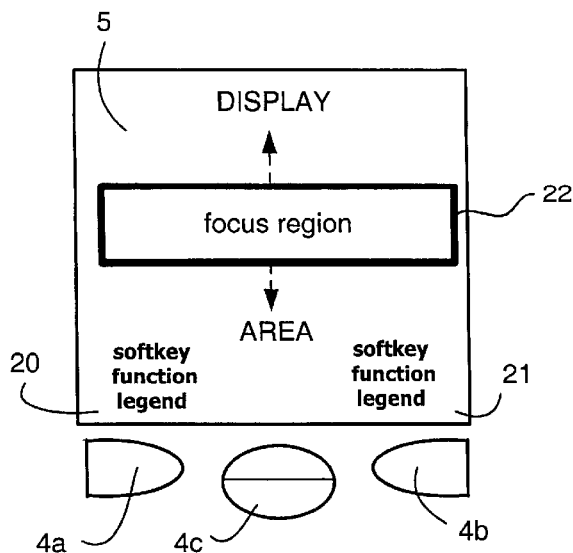
Fig. 3A
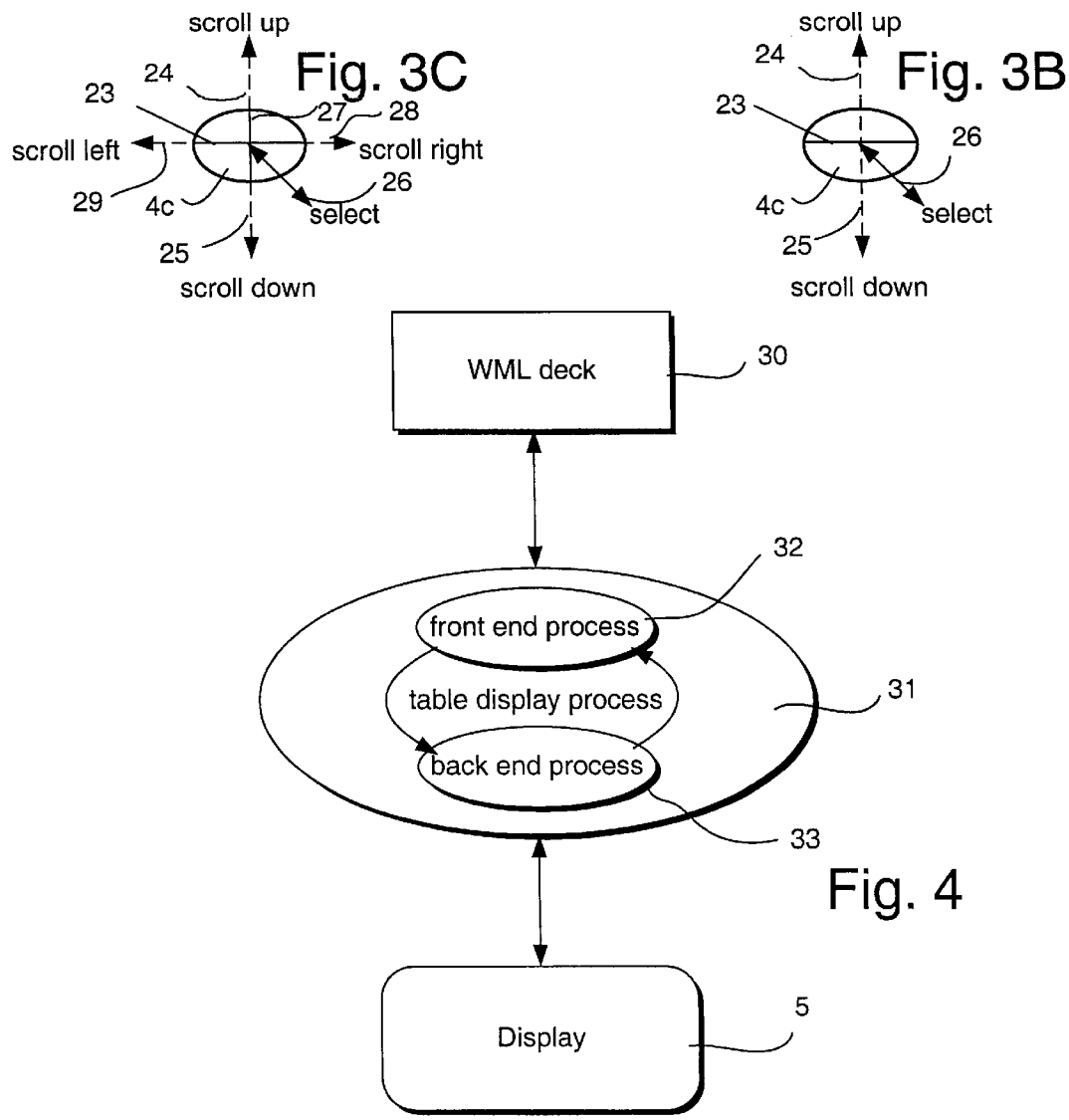
Fig. 3C
Fig. 3B
Fig. 4

DISPLAYING A TABLE

BACKGROUND OF THE INVENTION

This invention relates to displaying a table of data and has particular but not exclusive application to providing a tabular display of data on a mobile device with a restricted screen display area, such as a mobile telephone handset or a personal digital assistant (PDA).

Conventional mobile telecommunications devices, such as telephone handsets, have been designed primarily for speech calls and have only a limited capability for handling data. For example, in GSM, a short message service (SMS) has been provided to permit the user to send and receive short text messages that can be transmitted through a cellular public land mobile network (PLMN). More recently, recommendations have been developed to provide a wireless application protocol (WAP) to promote common standards and specifications for data services that operate over wireless communication networks. WAP enabled telephone handsets have been developed which allow the user to access remote servers. Data content is provided in a markup language, similar to conventional hypertext markup language (HTML), known as wireless markup language (WML), which is configured to allow a page of HTML data to be displayed as a deck of individual cards which are of a size suited for display on the relatively small display screen usually available on a mobile device such as a cellular telephone handset or PDA.

A WAP server can be accessed by dialling an individual telephone number associated with a WAP gateway which acts as a proxy server between the WAP server itself and the mobile device which acts as a client. Thus, individual WAP servers can be accessed by a user, by dialling the telephone numbers associated with the individual WAP gateways that provide access to the servers.

WML allows tables to be defined comprising rows and columns of cells. There is no upper limit on the number of rows and column that can be specified and so a service provider can provide from its server a table with a larger number of rows and columns than can conveniently be displayed by means of the restricted display usually associated with a mobile device such as a mobile telephone handset or PDA. The present invention seeks to overcome this problem.

SUMMARY OF THE INVENTION

According to the invention there is provided an apparatus for displaying data in a table that comprises a configuration of cells for containing the data, comprising: a display device operable to display at least some of the table data, and a scrolling device to scroll through the displayed table data, the arrangement being such that in use, the cells are displayed in a first arrayed configuration, the scrolling device permits a selection of the cells to be made, and the selected cells are displayed in a second arrayed configuration, and the scrolling device permits scrolling through the cells in the second arrayed configuration to be carried out so as to select one of them.

The table may comprise rows and columns of the cells and the display device may be operable to display at least some of the cells of table data in rows and columns, such that the scrolling device permits a row selection to be made, such that the selected row is displayed configured as a column whereby scrolling device permits scrolling through the cells of the configured column.

The apparatus may include a processor operable to scale the displayed width of an individual column suitable for displaying all of its contained data in the cells thereof, as an inverse function of an aggregate column width suitable for displaying all of the data of the cells of the columns of the table, and the width may be scaled so as not to be less than a predetermined minimum width for displaying a predetermined minimum amount of data from each cell. In this way, the width of the displayed columns may be scaled downwardly to allow more columns to be included in the display but not so as to make the displayed information indiscernible for the cells If a cell includes more than one item of data, the display device may be operated so as to display only a predetermined number, for example only one, of said items per cell when said rows and columns of cells are displayed. This facilitates a display on an overview of the table when the cells are displayed in rows and columns. All of the items of data may be displayed when the configured column is displayed and each of the items may be displayed with a respective predetermined alignment.

The apparatus may comprise a mobile device such as a mobile telephone handset or a PDA, which may be WAP enabled.

The invention also includes a corresponding method of displaying a table.

In another aspect, the invention includes apparatus for displaying data in a table that comprises rows and columns of cells for containing the data, comprising: a display device operable to display at least some of the table data, and a processor to provide the data to be displayed by the display device, the processor being operable to scale the displayed width of an individual column suitable for displaying all of the data contained in the cells thereof, as an inverse function of an aggregate column width suitable for displaying all of the data of the cells of the columns of the table, but so as not to be less than a predetermined minimum width for displaying a predetermined minimum amount of data from each cell of the individual column.

In a further aspect the invention includes apparatus for displaying a table that comprises rows and columns of cells for containing data, comprising: a display device to display a plurality of the cells of the table in said rows and columns within a predetermined display area, a selector for selecting one of the cells, and a controller operable to drive the display device so that the selected cell is displayed over at least a major part of the display area.

BRIEF DESCRIPTION OF THE DRAWINGS

In order that the invention may be more fully understood an embodiment thereof will now be described by way of example with reference to the accompanying drawings in which:

FIG. 3 illustrates schematically the display of the handset and the associated keys 4;

FIGS. 3B and C illustrate different scrolling functionalities associated with key 4c;

FIG. 4 illustrates the major processes carried out to display a table;

DETAILED DESCRIPTION OF THE INVENTION

Figure 1:
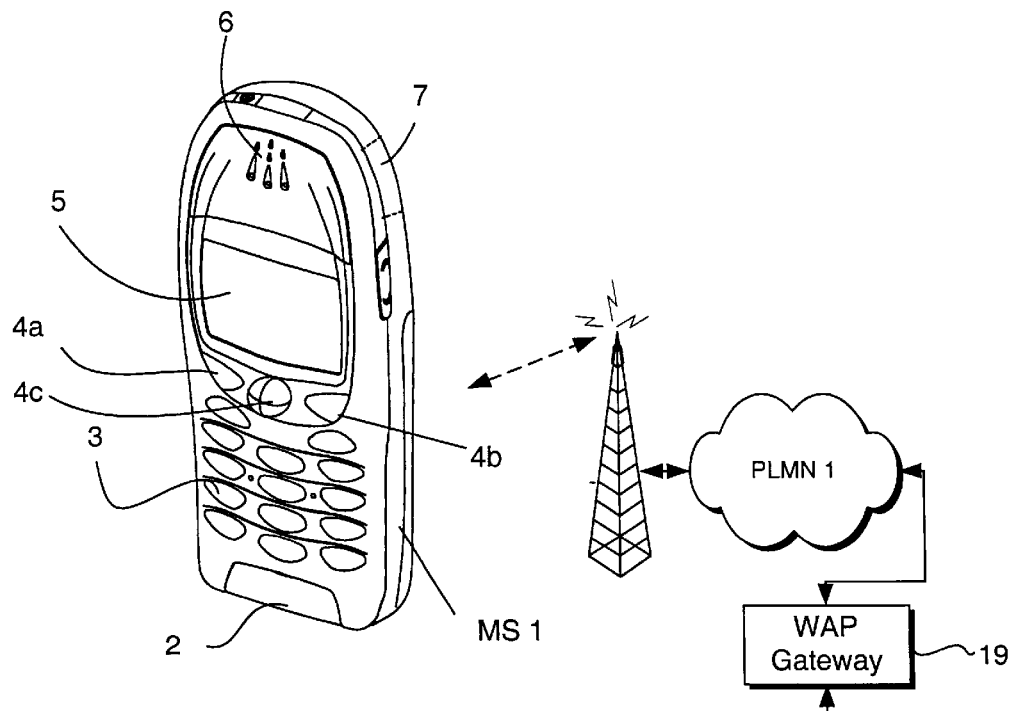
FIG. 1 is a schematic block diagram illustrating a mobile telephone handset which can communicate through PLMN to a WAP server.

In FIG. 1, a mobile station in the form of a battery driven telephone cellular handset MS 1, is shown schematically in radio communication with PLMN 1. The mobile handset MS1, includes a microphone 2, keypad 3, soft keys 4, a liquid crystal display device 5, ear-piece 6 and internal antenna 7. As will be explained in more detail, the handset 1 is WAP enabled.

Figure 2:
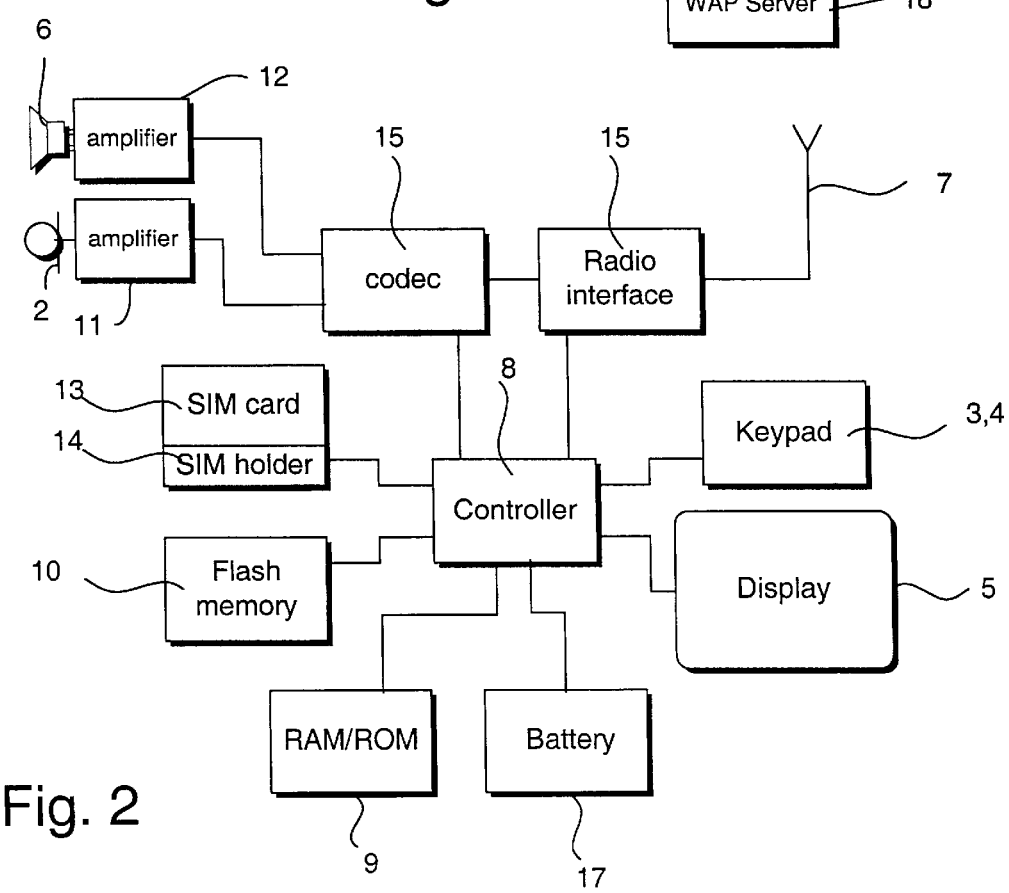
FIG. 2 is a schematic block diagram of the circuitry of the mobile handset shown in FIG. 1.

The circuitry of the handset MS 1 is shown in more detail in FIG. 2. Signal processing is carried out under the control of a digital micro-controller 8 which has an associated RAM/ROM 9 and flash memory 10. Electrical analogue audio signals are produced by microphone 2 and amplified by pre-amplifier 11. Similarly, analogue audio signals are fed to the ear-piece 6 through an amplifier 12. The micro-controller receives instruction signals from the keypad and so-called soft keys 4 and controls operation of the LCD display 5.

Information concerning the identity of the user is held on a smart card 13 in the form of a GSM SIM card which contains the usual GSM international mobile subscriber identity and encryption $K_i$ that is used for encoding the radio transmission in a manner well known per se. The SIM card 13 is removably received in a SIM card holder 14. Radio signals are transmitted and received by means of the antenna 7 connected through a rf stage 15 to a codec 16 configured to process signals under the control of a micro-controller 8. Thus, in use, for speech, the codec 16 receives analogue signals from the microphone amplifier 11, digitises them into a form suitable for transmission and feeds them to the rf stage 15 for transmission through antenna element 7 to PLMN 1 shown in FIG. 1. Similarly, signals received from PLMN 1 are fed through the antenna element to be demodulated by the rf stage 15 and fed to codec 16 so as to produce analogue signals fed to amplifier 12 and ear-piece 6.

The handset 1 is WAP enabled and capable of receiving data in a predetermined channel e.g. for GSM, at 9.6 Kbit/sec. Also, the handset may be configured to receive a high speed circuit switch data (HSCSD) according to the GSM recommendations, at a data rate from 14.4–43.2 Kbit/sec. It will however be understood that the invention is not restricted to any particular data rate and that higher rates could be used. The WAP content and its applications are specified in a well known set of content formats based on familiar www content formats. WAP is disclosed in the Wireless Application Protocol Architecture Specification; version 30 Apr. 1998, published by the Wireless Application Protocol Architecture Working Group (see also http://www.wapforum.org/docs/technical.htm/arch-30-apr-98.pdf).

As known in the art, the WAP environment (WAE) provides a browser e.g. a micro-browser operable on the handset MS 1 as a client, for connection to WAP servers. The browser is configured to operate with WML which, as previously mentioned comprises a lightweight markup language similar to HTML but optimised for use in hand-held mobile terminals, WML script—a lightweight scripting language similar to JAVA Script™, wireless telephony application (WTA, WTAI) telephony services and programming interfaces, and content formats—a well known set of data formats including images, phone book records and calendar information.

Data can be downloaded to the browser from a WAP server such as server 18 shown in FIG. 1. The server 18 provides WML decks of cards, corresponding to conventional pages of HTML such that a deck can be downloaded to the handset 1 and the individual cards manipulated for display by means of the keys 3, 4. The server 18 is accessed through a gateway 19 which acts as a proxy server. The handset MS 1 can access the gateway 19 by dialling a predetermined telephone number.

The WML data downloaded from the server 18 may be held in the RAM 9 or the flash memory 10. The microcontroller 8 provides the browser functionality and causes individual cards of the downloaded WML deck to be presented to the user in the browser on the screen of the display 5, and the display can be manipulated by means of the keys 4.

The functionality of the soft keys 4 will now be described in more detail with reference to FIG. 3. As shown in FIG. 3A, the keys 4 are disposed adjacent the underside of the display 5. The keys 4a, 4b comprise manually depressible buttons. Their functionality can be pre-programmed depending upon the task performed. The function attributed to the keys is displayed on the display 5 as soft key function legends 20, 21 adjacent to the respective keys 4a, 4b.

The key 4c comprises a roller device to perform a scrolling function for the display 5. In use, an active or focus region 22 is provided on the display which, as explained in more detail later, can be moved around the display area. The roller 4c may comprise a 3-way roller, as shown in FIG. 3B. The roller may be pushed by the user's finger, to pivot about axis 23. When pushed upwardly, in the direction of arrow 24, a "scroll-up" function is performed. Conversely, when pushed downwardly in the direction of arrow 25 a "scroll-down" function is performed. Additionally, the roller 4c may be manually depressible inwardly of the handset, in the direction of arrow 26, to perform a "select" function. Alternatively, the key 5c may be configured as a five-way roller as shown in FIG. 3c, so as additionally to pivot about axis 27 so as to perform right and left scrolling functions in the direction of arrows 28 and 29. Alternatively, the key 4c may comprise a rollerball, a touch pad or other navigation device of the type used in laptop computers.

As previously explained, the information displayed on the display 5 comprises WML data. The specification for WML can be found in WAP WML Version 4—November 1999 "Wireless Application Protocol Wireless Mark Up Language Specification Version 1.2" published by Wireless Application Protocol Forum Limited, which can also be found at http//www1.wapforum.org/tech/documens/spec-wml-19991104.pdf.

WML Table Element

WML includes an element which allows tables to be specified, namely

<!ELEMENT table (tr)+>

This element has the following attributes

Title

This attribute specifies the title for the element

Align

This attribute specifies the layout of the text and images within the columns of a table. A column's contents can be center aligned, left aligned or right aligned. The attribute value is interpreted as a non-separated list of alignment designations, one for each column. Center alignment is specified with the value "C", left alignment is specified with the value "L", right alignment is specified with the value "R" and a default alignment is specified with the value "D".

Columns

This attribute specifies the number of columns for the table.

It is to be noted that WML does not define how the table is actually presented and, for example, in a telephone handset, the algorithms run by the micro-controller determine the actual style of presentation of a table. The table element does not have an upper limit on the number of columns that can be specified.

The Tr Element

This specifies the number of rows in a particular table as follows:

<!ELEMENT tr (td)+>

The Tr element is used as a container to hold a single table row.

Cell Element

This element allows data for individual cells of the table to be specified as follows:

<!ELEMENT td >

The td element is used as a container to hold a single table cell within a table row.

WML Example

The following example contains a card with a single column group, containing two columns and three rows.

```
<wml>
    <card>
    <p>
      <table columns="2" align="LL">
        <tr><td>One </td><td>Two </td></tr>
        <tr><td>1/td><td>A</td>
        <tr><td/><td> B </td><td>C<br/>D</td></tr>
      </table>
    </p>
    </card>
</wml>
```

The layout for this card is:

| One | Two |
|---|---|
| 1 | A |
|  | B C |
|  | D |

It is to be noted that the WML elements that specify a table impose no restriction on the number of rows and column and so the service provider can specify a table which is much larger than the display area for display 5. The invention seeks to provide a convenient mode of display for such large tables, within the restricted display area of the display 5.

Referring to FIG. 4, the algorithms run by the micro-controller 8, for displaying a table, as shown. A WML deck, e.g. held in RAM 9, containing WML table data 30, is operated upon by a process 31, run by the micro-controller 8 to provide a display of the table on the display screen 5.

The process 31 consists of a front end process 32 that initially provides a display of rows and columns of the table, as explained in more detail hereinafter, and a back end process 33 provides a more detailed display of a part of a table selected by the user. As explained in more detail later, the user can select a particular row from the initially displayed table produced by the front end process, and the back end process then displays the various data cells that make up the row, as a column, so that the user can scroll through the column to select a particular cell. A detailed example will now be given with reference to FIGS. 5 and 6. In this example, the downloaded WML contains data corresponding to the following table. It can be seen that the table is made up of rows and columns of cells.

TABLE 1

| C11.1 | C12.1 | C13.1 |
|---|---|---|
| C11.2 | | |
| C11.3 | | |
| C21.1 | C22.1 | C23.1 |
| | C22.2 | |
| C31.1 | C32.1 | C33.1 |
| | C32.2 | C33.1 |
| C41.1 | C41.1 | C41.3 |

Each cell has contents indicated by CXY.Z where Z>1 indicates cells having several types of contents such as text, link, or bitmapped image. It will be understood that the table is presented in the WML data by the table element, row element and cell data element previously described.

Figure 5:
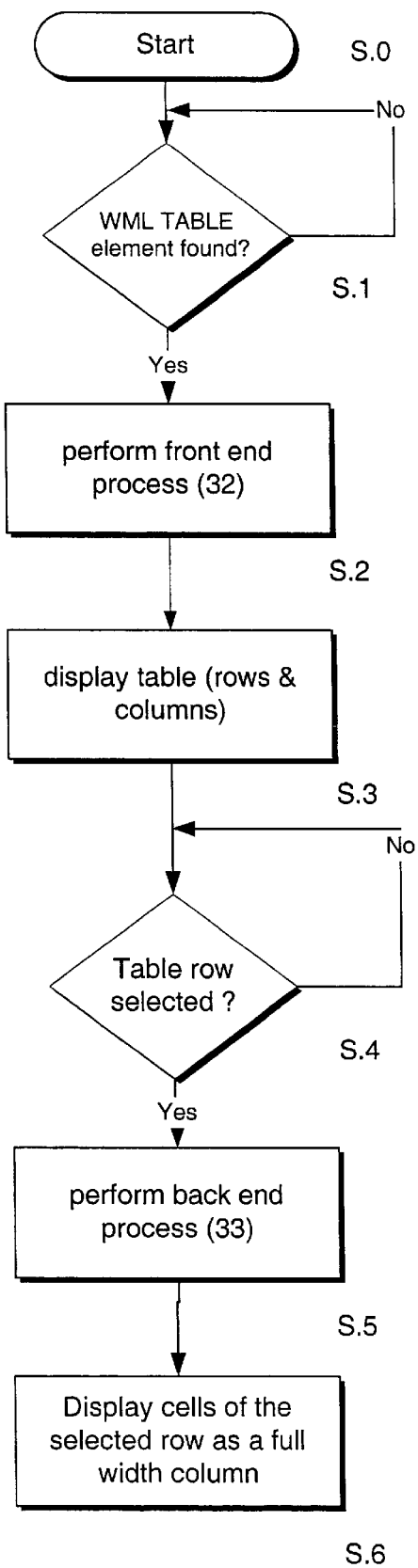
FIG. 5 is a schematic flow diagram for displaying a table.
Figure 6A:
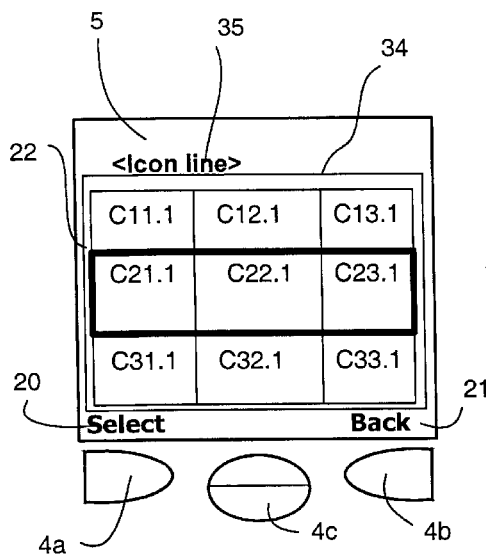
FIGS. 6A–D illustrate a sequence of screen shots for the display, when the table is displayed by front end table display process.

Referring to FIG. 5, the table display process 31, starts at step S0 and when a table element is found at step S1, the front end process 32 is performed at step S2. This results in a display of rows and columns of the table on the display 5, as indicated by step S3. The number of columns is selected according to an algorithm to be described later. The purpose of the front end process is to provide the user with an overview of rows and column of the table and the resulting display on the display device 5 is shown in FIG. 6A. Only the first element of each cell is shown i.e. data CXY.1 for each cell, thus providing the user with overview information only. In this example, three columns and three rows conveniently fit into the available display area 34 of the display device 5. An icon line 35 displays data relating to the siz of the table and the location of the focus 22 within the array of cells C that make up the table.

The focus 22 is shown highlighting the second row of the display table in FIG. 6A. In this example, the key 4c comprises a three way scroller as shown in FIG. 3B. Thus by operating the scroller, the focus can be scrolled through the rows displayed on the display device, as will now be described in detail.

Figure 6B:
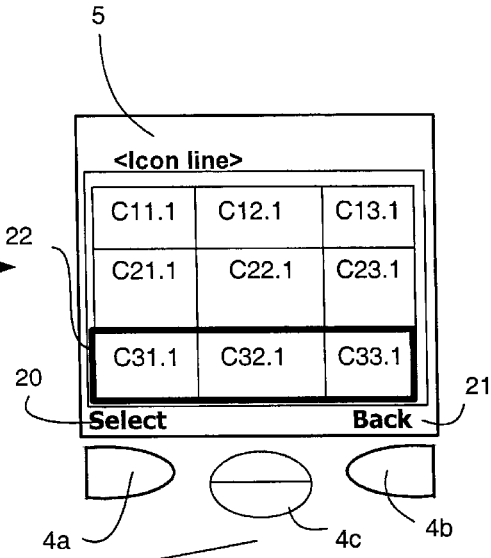
Figure 6C:
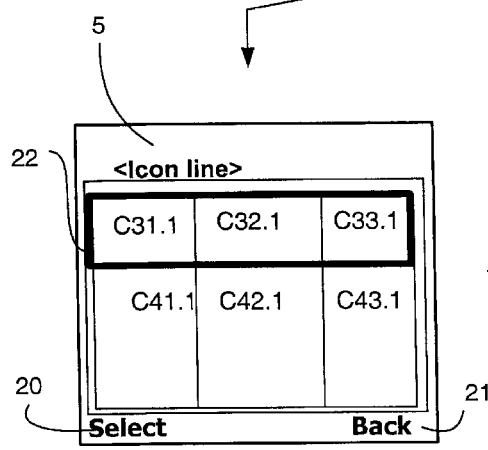
Figure 6D:
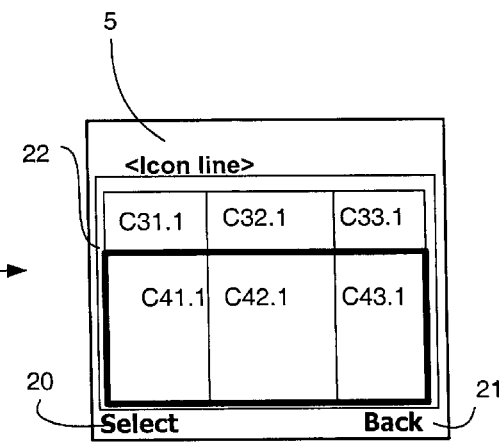

When the scroller 4c of FIG. 6A is operated in the direction of arrow 25, the focus 22 moves downwardly in the displayed screen 5 to assume the configuration shown in FIG. 6B. The subsequent operation of the scroller 4c, causes the display to shift upwardly on the screen as shown in FIG. 6C and then, a subsequent scroll down operation of the scroller 4c causes the focus 22 to move downwardly to the lowermost row of the table, as shown in FIG. 6D. The scrolling can also be carried out in an upward direction, by means of the scroll up function of the roller 4c.

In this way, the user can move the focus 22 to a particular row of the displayed table.

In the following example, it is assumed that the user wishes to select one of the cells of the first row of the table and so the focus 22 is scrolled to the position shown in FIG. 7A.

Figures 7A, 7B:
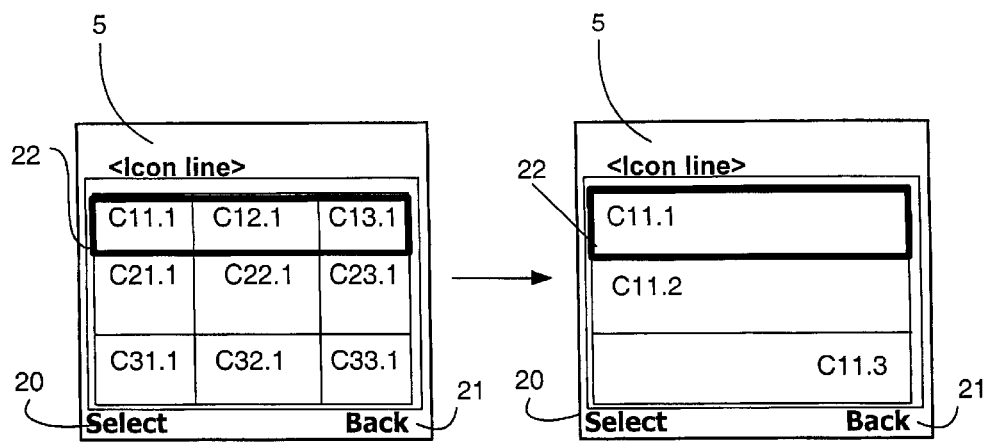
FIGS. 7A–K illustrate screen shots for a table when displayed according to a back end display process.

FIG. 7A shows the focus 22 aligned with the first row of the table. The first row is then selected either by pressing the three way roller key 4c downwardly, in the direction of arrow 26 shown in FIG. 3B, or by operating the soft key 4a which has been provided with a "select" functionality indicated by legend 20 on display device 5.

When the row has been selected, which corresponds to step S4 in FIG. 5, the back end process 33, performed in step S5, displays the contents of all of the data in the cells that make up the selected row, as an individual column in which each item of data is displayed across the entire available width of the display area 34 as shown in FIG. 7B. Each data item has an alignment as specified in Table 1 above. It will be seen that the first cell C11 contains three items of data C11.1, C11.2 and C11.2 each with a different alignment within the cell. The user can now scroll upwardly and downwardly through these individual data elements.

Figures 7C, 7D:
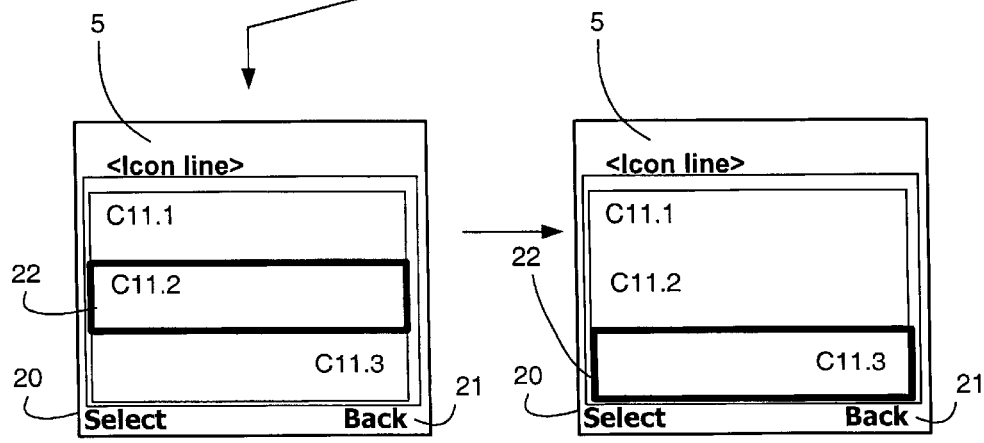

In FIG. 7B, the focus 22 is aligned with data C11.1. The focus can be scrolled downwardly by operation of key 4c to data C11.2, as shown in FIG. 7C. Then, further operation of key 4c scrolls the focus 22 further downwardly, to data C11.3. Further scrolling results in the configuration shown in FIG. 7E, in which the displayed column moves upwardly to display data in subsequent cells, namely C12.1 and C13.1.

Figures 7E, 7F:
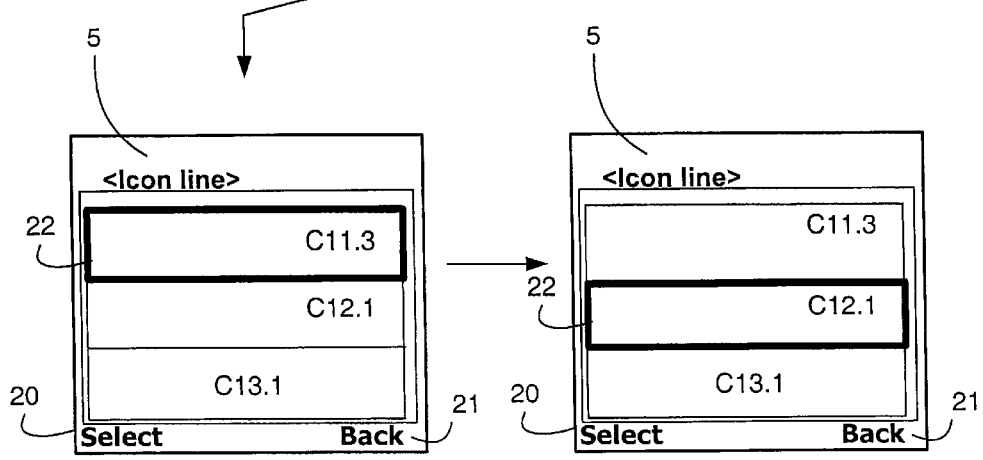
Figures 7G, 7H:
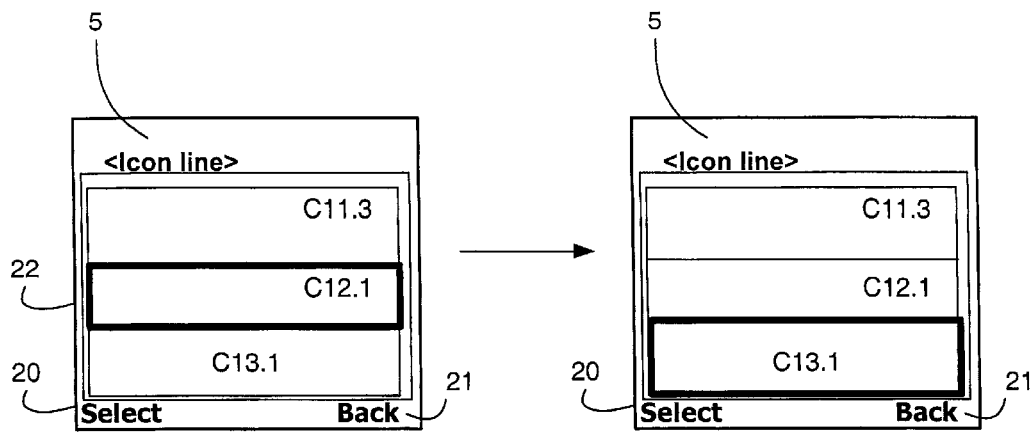

Then, subsequent scrolling causes focus 22 to move downwardly to the next cell namely C12.1 as shown in FIG. 7F. Subsequent scrolling operations through the remaining cells that made up the selected row are shown in FIGS. 7G, H and I.

Figures 7I, 7J:
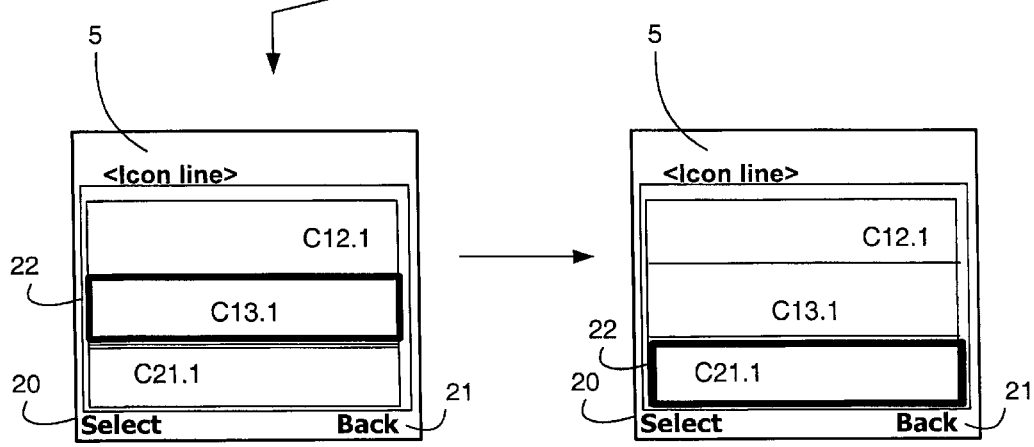

Then, as shown in FIG. 7J, the scrolling operation then moves to the next lower row of the table as shown in FIG. 6A and the scrolling will continue through a column corresponding to the second table row, namely C21.1, C22.1, C22.2 etc.

Figure 7K:
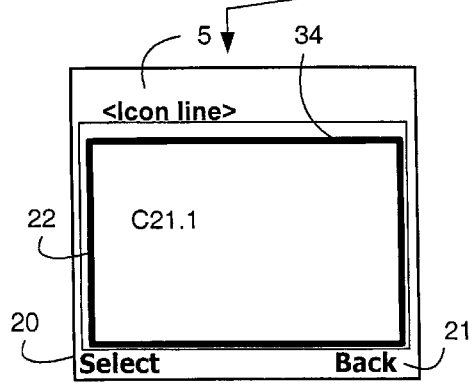

An enlarged view of one of the data elements can be provided as shown in FIG. 7K in which the cell fills the entire display area 34 of the display device 5. This is achieved by scrolling to the desired cell and selecting it be depressing the key 24c downwardly in the direction of arrow 26 (FIG. 3B) In the example of FIG. 7K, the cell C21, previously selected from the display shown in FIG. 7J, is expanded to the entire display area 34, to provide more easily discernible display for the user. By subsequently selecting the cell, an action associated with the data element can be performed. For example, if the cell contains a URL, a link corresponding to the URL will be established.

Table Rendering Routine

As previously mentioned, the WML element "Table" does not have a maximum number of rows or columns and so the service provider can specify tables which are larger than can normally be fitted on the display area 34 of display device 5. When a relatively large table is specified e.g. nine columns, the width of the columns is modified according to the invention; the width of the columns is scaled in order to fit as many as reasonably possible into the restricted area of the display 5 onto the display.

Figure 8:
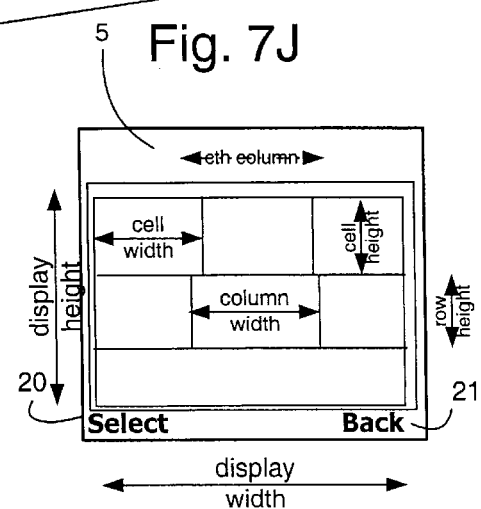
FIG. 8 illustrates cell width and height definitions for the displayed table.

FIG. 8 shows the basic definitions used in the table rendering routine. Although the table in FIG. 8 indicates cells having different widths the actual rendered table has aligned columns.

Column Rendering

The table includes j columns and a first step in the table rendering routine is to determine the maximum width of each column $$\sum_j ColumnWidth(i) > DisplayWidth$$

where CellWidth(r,c) is the width of the cell at the intersection point of the r'th row and the c'th column.

If the contents of the cells having maximum width occupy more width (display width) that is available, that is, if $$\forall c: ColumnWidth(c) = \frac{DisplayWidth \times ColumnWidth(c)}{TotalUsedWidth} \quad (1)$$

then the width of each column (column width) is reduced proportionally, as not to inflict any interpretation on the importance of the content of each column The formula used is $$TotalUsedWidth = \sum_j ColumnWidth(j)$$

where $$\forall c: ColumnWidth(c) = \max_r(CellWidth(r, c))$$

If the above described column scaling scheme were used without restriction, a problem would be encountered when tables with relatively large numbers of columns are to be displayed. For example, a table with 30 columns if scaled using the formula of equations 1 and 2, would result in a very narrow column width which would not display discernible information to the user. Therefore, in accordance with the invention, each column is set to have a minimum width determined by trial and experiment to be a minimum width for conveying discernible information to the user in the display. This can be expressed as follows:

$$\forall c: \text{Column Width}(c) < \text{Minimum Width:Column Width}(c) = \text{Minimun Width} \quad (2)$$

As the columns having width larger than the minimum width are left un-altered, this will reduce the number of visible columns presented by the front end process 33.

Based on the column widths obtained using Equation 1 and Equation 2, the number of visible columns—counting from left to right—of determined as the maximum number of columns who summed widths are less than the display width, that is the number noVC, that fulfils the $$\sum_{1 \le c \le noVC} ColumnWidth(c) \le DisplayWidth \ \& \quad (3)$$

$$\sum_{1 \le c \le noVC+1} ColumnWidth(c) > DisplayWidth$$

following equation:

In right to left languages the above calculation of the visible columns are carried out from right to left.

It will be understood that the proportional reduction as well as the infliction of minimum cell width is invoked only if the table doe not fit the display width.

Figure 9:
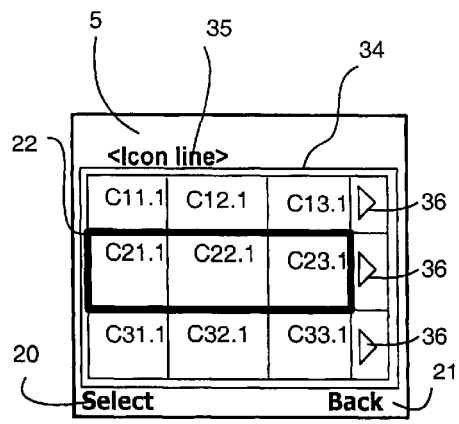
FIG. 9 illustrates details of the display.

When the table is reordered as described above, not all columns will be displayed for a table with a large number of columns. In this situation, the user can be informed that only a portion of each row is being displayed by means of chevrons 36 as shown in FIG. 9, which point in the direction of non-displayed cells of the table. Thus, by selecting a particular row, it is then displayed as a column by the aforementioned back end process so that the individual items can be selected from the row when displayed as a column, including the cells that were not displayed in the row.

Figure 10A:
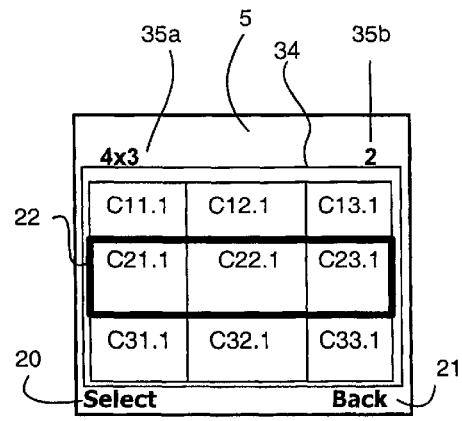
FIGS. 10A–B illustrates further details of the display.
Figure 10B:
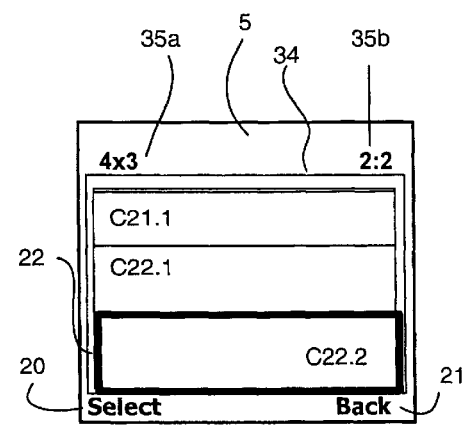
Figure 11:
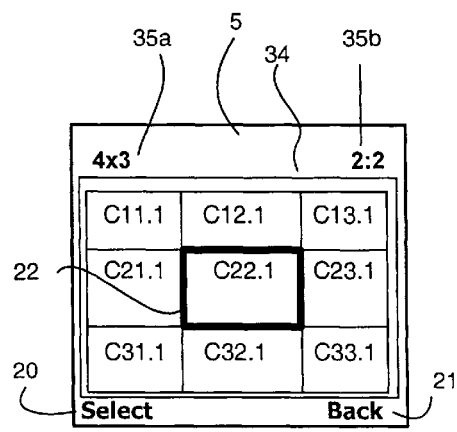
FIG. 11 illustrates still further details of the display.

In another display shown in FIG. 10, which may be used alternatively to or additionally with the chevrons 36 of FIG. 9, the icon line 35 display details of the size of the cell array that makes up the table together with information concerning the location of the focus 22 within the array. FIG. 10A shows a display produced by the front end process 32 of a table that comprises four columns and three rows i.e. a 4×3 cell array. The size of the cell array is displayed to the user by icon 35a. The location of the focus 22 in the cell array is shown by icon 35b. In the example of FIG. 10A, the focus is in the second row and hence the icon 35b shows "2". When the second row is selected by the user, as previously explained, the back end process 33 is run so that the items of data in the second row is displayed as a column as shown in FIG. 10B. In this situation, the icon 35b displays both the row and column co-ordinates within the array. The example of FIG. 10B shows the focus 22 in the second column and in the second row i.e. "2:2". A corresponding display shown in FIG. 11 may be provided when using the five way roller which allows left and right scrolling through the cells of the table.

Row Rendering

The maximum height of each row is determined as $$\forall r : RowHeight(r) = \max_{0}(CellHeight(r, c))$$

and at any time the number of visible rows are determined as the number noVR, that fulfils the following equation:

$$\sum_{1 \le r \le noVR} RowHeight(r) \le DisplayHeight \ \&$$

$$\sum_{1 \le r \le noVR+1} RowHeight(r) > DisplayHeight$$

If a row obtains more height than remains, then the contents of that row are truncated. However, scrolling will reveal the remainder of its contents.

Many modifications and various to the described arrangement are possible. For example, whilst the invention has been described in relation to WML, it can be used with other table data, for example in HTML. Furthermore, whilst the example uses a mobile handset MS1, it will be appreciated that it is also applicable to PDAs and other mobile computer devices with a restricted screen display capability. The PLMN need not be a GSM network and may operate according to any appropriate protocol such as UMTS.

Furthermore, in the described example, the scrolling is performed using the three way key shown in FIG. 3B. However, the five way scrolling described in relation to FIG. 3C can also be used.

As used herein, the terms "row" and "column" are relative terms denoting relatively transverse directions across the arrayed cells of the table and are not used in a restrictive, absolute, directional sense relative to the display, the handset or any other external reference frame.

What is claimed is:

1. Apparatus for displaying data in a table that comprises a configuration of cells for containing the data, comprising: a display device operable to display at least some of the table data, and a scrolling device to scroll through the displayed table data, the arrangement being such that in use, the cells are displayed in a first arrayed configuration, the scrolling device permits a selection of the cells to be made, the selected cells are displayed in a second arrayed configuration, and the scrolling device permits scrolling through the cells in the second arrayed configuration to be carried out so as to select one of them.

2. Apparatus according to claim 1 wherein the table comprises rows and columns of the cells and the display device is operable to display at least some of the cells of table data in rows and columns, such that the scrolling device permits a row selection to be made, and the selected row is displayed configured as a column whereby scrolling device permits scrolling through the cells of the configured column.

3. Apparatus according to claim 2 including a processor operable to scale the displayed width of an individual column suitable for displaying all of its contained data in the cells thereof, as an inverse function of an aggregate column width suitable for displaying all of the data of the cells of the columns of the table.

4. Apparatus according to claim 3 wherein the processor is operable to scale the column width so as to be less than a predetermined minimum width for displaying a predetermined minimum amount of data from each cell.

5. Apparatus according to claim 2 wherein at least one of the cells includes more than one item of data and the display device is operable to display only a predetermined number of said items per cell when said rows and columns of cells are displayed.

6. Apparatus according to claim 5 wherein the predetermined number of items comprises a single item of data per cell.

7. Apparatus according to claim 5 wherein the display device is operable to display all of said items of data in said configured column when it is displayed.

8. Apparatus according to claim 5 wherein the items of data when displayed in said configured column are each displayed with a respective predetermined alignment.

9. Apparatus according to any preceding claim and comprising a mobile device.

10. Apparatus according to claim 9 and comprising a mobile telephone handset.

11. Apparatus according to claim 9 and comprising a PDA.

12. Apparatus according to claim 1 including a store to receive the table data.

13. Apparatus according to claim 1 configured to receive the table data in a mark-up language.

14. Apparatus according to claim 1 wherein the scrolling device comprises a three way roller.

15. Apparatus according to claim 1 wherein the scrolling device comprises a five way roller.

16. Apparatus according to claim 1 wherein the display device is operable to display a focus region which is scrollable through the cells of the array and to indicate the position of the focus within the array.

17. A computer program to be run on data processing apparatus to perform a method as claimed in claim 16.

18. Apparatus according to claim 1 wherein the display is operable to display not all the cells of the table in said first configuration and to indicate that not all of the cells are displayed.

19. Apparatus according to claim 1 wherein the display is operable to display the size of the array of cells that make up the table.

20. A method of displaying a table that comprises cells for containing data, comprising: displaying at least some of the cells of the table in a first arrayed configuration, scrolling through the cells to select some of them, and displaying selected cells in a second different arrayed configuration and scrolling through the cells in the second arrayed configuration to select one of them.

21. A method according to claim 20 including displaying the cells in rows and columns for the first arrayed configuration, selecting a row of the cells in the first configuration, and displaying the cells of the selected row in a column to provide said second configuration.

22. A method according to claim 21 including scaling the width of an individual column suitable for displaying all of its contained data in the cells thereof, as an inverse function of an aggregate column width suitable for displaying all of the data of the cells of the columns of the table.

23. A method according to claim 22 but so as not to be less than a predetermined minimum width for displaying a predetermined minimum amount of data from each cell.

24. A method according to claim 22 wherein at least one of the cells includes more than one item of data and including displaying only a predetermined number thereof when said rows and columns of cells are displayed.

25. A method according to claim 24 wherein a single item of data is displayed in each said cell.

26. A method according to claim 24 including providing all of said items of data for display when said configured column is displayed.

27. A method according to claim 24 wherein the items of data in said configured column are each displayed with a respective predetermined alignment.

28. A computer program to be run on data processing apparatus to perform a method as claimed in claim 27.

* * * * *